United States Patent [19]

Sublette

[11] 4,286,120
[45] Aug. 25, 1981

[54] CURRENT REGULATED PULSE DIALER CIRCUIT

[75] Inventor: John D. Sublette, Huntsville, Ala.

[73] Assignee: GTE Automatic Electric Labs Inc., Northlake, Ill.

[21] Appl. No.: 84,960

[22] Filed: Oct. 15, 1979

[51] Int. Cl.³ .............................................. H04M 1/31
[52] U.S. Cl. .................................. 179/90 K; 179/77
[58] Field of Search ............ 179/90 K, 77, 71, 16 EC, 179/90 B

[56] References Cited

U.S. PATENT DOCUMENTS

| | | |
|---|---|---|
| 3,916,114 | 10/1975 | Persson ................................. 179/77 |
| 3,932,707 | 1/1976 | Connolly et al. .................. 179/90 K |
| 3,973,084 | 8/1976 | Hovland ............................ 179/90 K |
| 3,980,837 | 9/1976 | Jakobsson .......................... 179/90 K |
| 4,046,971 | 9/1977 | Losehand .......................... 179/90 K |
| 4,081,619 | 3/1978 | Losehand .......................... 179/90 K |
| 4,167,655 | 9/1979 | Hestad et al. ..................... 179/90 K |

Primary Examiner—Gerald L. Brigance
Attorney, Agent, or Firm—Robert J. Black; Gregory G. Hendricks

[57] ABSTRACT

A current regulated pulse dialer circuit for use in a loop powered pulse dialing telephone. A current source is connected to an electronic pulse dialer to provide high impedance across a telephone line during transmission and interpulse pause conditions.

5 Claims, 1 Drawing Figure

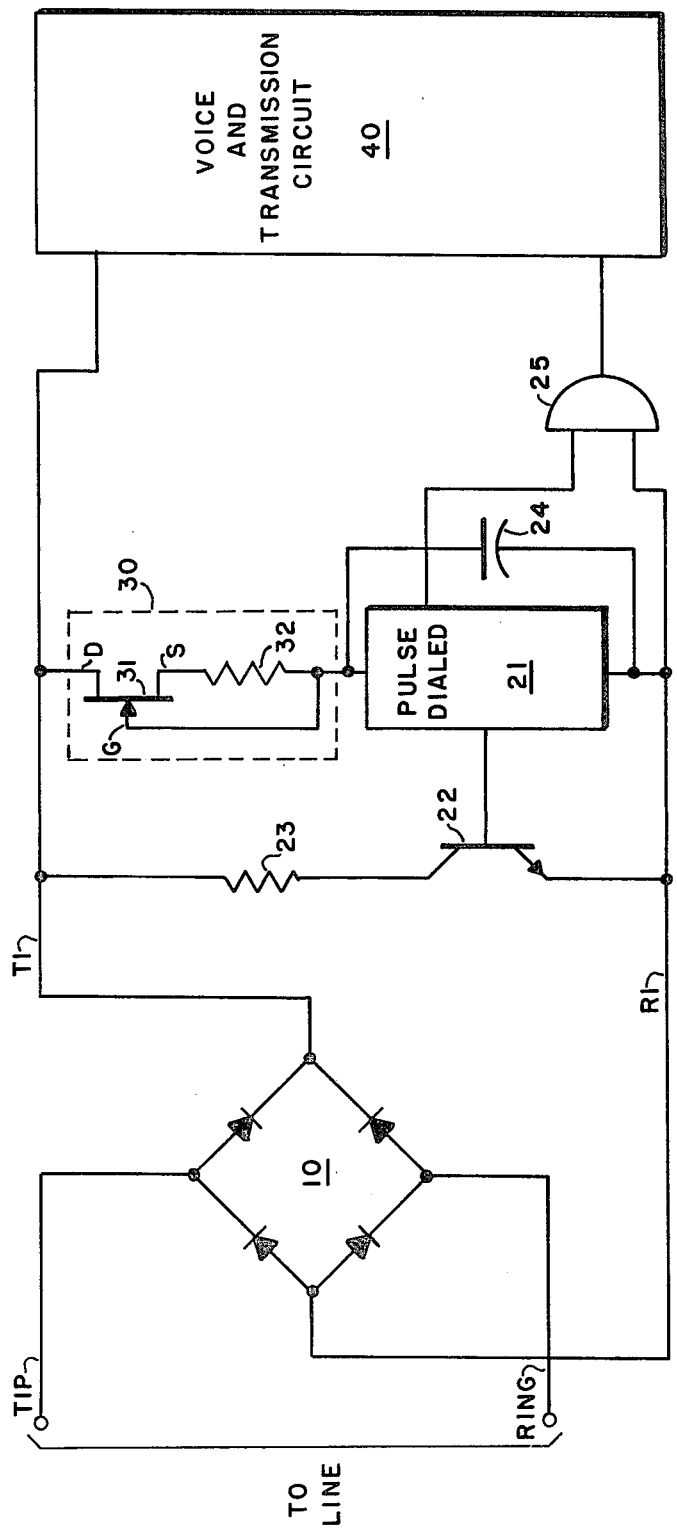

CURRENT REGULATED PULSE DIALER CIRCUIT

BACKGROUND OF THE INVENTION (1) Field of the Invention

The present invention relates to electronic pulse dialers and more particularly to current regulated pulse dialers. A current source connected to an electronic pulse dialer provides high impedance to a telephone line during transmission and interpulse pause conditions.

(2) Description of the Prior Art

Pulse dialers have been adapted to telephones to provide pushbutton operation while retaining dial pulse signaling. To provide this feature, a pulse dialer is connected across a telephone loop and operates to output pulse signals by breaking and closing the loop. However since the pulse dialer is connected across the loop it presents a low impedance during transmission open circuit pulsing conditions. Since there is not a true open loop condition during the break period of outpulsing, dial pulse distortion (low amplitude pulses) results causing a reduction in the usable loop length. Similarly the pulse dialer presents a low impedance across the loop during transmission conditions, thus shunting speech signals and causing degradation of transmission characteristics. This problem is inherent with electronic pulse dialers and has only been overcome through the use of relays to break the loop and provide true open circuit conditions.

Accordingly, it is the object of the present invention to provide a novel, low cost and highly reliable means of providing open circuit conditions to a telephone line during transmission and interpulse pause conditions.

SUMMARY OF THE INVENTION

The current regulated pulse dialer circuit of the present invention provides high impedance across a telephone loop during transmission and interpulse pause conditions when an electronic pulse dialer is used for outpulsing.

The current regulated pulse dialer circuit includes a bridge circuit connected across the tip and ring leads of a telephone loop. A current regulator is connected to a pulse dialer, both of which are connected across the telephone line via the bridge circuit. The pulse dialer is further connected to a pulsing transistor which is also connected across the telephone line. A tip lead of the telephone line is connected to the voice and transmission circuit while a ring lead is connected to the voice and transmission circuit via a gate circuit which is also connected to the pulse dialer.

When the pulse dialer receives a digit from a key pad in an associated telephone it turns the pulsing transistor on and off in accordance with the number of pulses which represent the keyed digit. Prior to generation of the first pulse, the pulse dialer turns the pulsing transistor on and disables the gate connected to the ring lead to break the loop through the voice and transmission circuit provides loop continuity. Thus the pulsing transistor maintains the loop when it is on and it generates interpulse pauses by opening the loop when it is off.

The current regulator provides the dial pulser with a high impedance thus eliminating the shunting effect of the dial pulser. By providing this high impedance the transmission degradation and pulse distortion characteristics are eliminated since the pulse dialer no longer shunts the loop to any significant degree.

DESCRIPTION OF THE DRAWING

The single FIGURE of the accompanying drawing is a circuit diagram of a current regulated pulse dialer circuit in accordance with the present invention.

DESCRIPTION OF THE PREFERRED EMBODIMENT

Referring now to the accompanying drawing, the current regulated pulse dialer of the present invention is shown connected to a line via tip and ring leads. The pulse dialer circuit includes polarity guard 10 connected across the tip and ring leads and further connected to T1 and R1 leads. The series combination of pulsing transistor 22 and resistor 23 is connected across the T1 and R1 leads as is the series combination of current source 30 and pulse dialer integrated circuit 21. Pulse dialer integrated circuit 21 is further connected to pulsing transistor 22. Capacitor 24 is connected across pulse dialer integrated circuit 21. Lead R1 is connected to voice and transmission circuit 40 via gate 25 which is further connected to pulse dialer integrated circuit 21. Lead T1 is also connected to voice and transmission circuit 40. Current source 30 includes transistor 31 connected to resistor 32. Pulse dialer integrated circuits are well known, such as National Semiconductor Corporation's MM53190 pushbutton pulse dialer.

The current regulated pulse dialer circuit of the present invention operates to reduce pulse distortion and transmission degradation. During dialing operations pulse dialer integrated circuit 21 initially operates to turn on pulsing transistor 22 thus providing a connection between the T1 and R1 leads. It also disconnects lead R1 from voice and transmission circuit 40 by turning off gate 25. Thus the loop is maintained through pulsing transistor 22 and it is disconnecting from voice and transmission circuit 40. Pulse dialer circuit 21 operates to generate dial pulses on the tip and ring leads by causing pulsing transistor 22 to turn-off and turn-on. When pulsing transistor 22 is turned on a closed loop is maintained, however, when pulsing transistor 22 is turned off a true open circuit is not maintained because pulse dialer circuit 21 is also connected in shunt across the T1 and R1 leads. During dial pulsing this additional shunt causes dial pulse distortion since sufficient current can flow through pulse dialer 21 to prevent a true open circuit condition thereby reducing the amplitude of the dial pulses. This dial pulse distortion (low amplitude dial pulses) causes a reduction in usable loop length.

Current source 30 was connected in series with dial pulse circuit 21 to present a high impedance across the T1 and R1 leads through dial pulser 21. Current source 30 operates to provide this high impedance by limiting the current through it. As current flow increases through resistor 32 the gate-to-source voltage increases causing transistor 31 to limit current flow through it and thereby ultimately causing the current flow to stabilize, thus regulating the current flow to pulse dialer circuit 21.

Since pulse dialer circuit 21 is always connected across the T1 and R1 leads it also operates as a shunt during transmission operations, thereby causing degradation of transmission characteristics. Current source 30 similarly operates to provide a high impedance during this mode of operation thus limiting the current shunting effect of pulse dialer circuit 21 and thereby improving the transmission characteristics.

Capacitor 24 operates to smooth and filter the voltage to pulse dialer circuit 21.

The current regulated pulse dialer circuit of the present invention thus prevents dial pulse distortion and transmission degradation in a pulse dialer circuit by limiting the loop shunting effect of the pulse dialer.

It will be obvious to those skilled in the art that numerous modifications of the present invention can be made without departing from the spirit of the invention which shall be limited only by the scope of the claims appended hereto.

What is claimed is:

1. A current regulated pulse dialer circuit for use in a pulse dialing telephone, including digit signaling means and a line connection, said pulse dialer circuit comprising:

pulse dialing means connected to said digit signaling means and to said line connection, operated in response to a digit signal to decode said digit signal and generate pulses, representative of said digit on said line connection; and a current regulator connected to said pulse dialing means and to said line connection operated to increase the impedance across said line connection through said pulse dialing means.

2. A current regulated pulse dialer circuit as claimed in claim 1, wherein there is further included a voice and transmission circuit, said pulse dialer circuit further comprising:

gating means connected to said voice and transmission circuit, said line connection and said pulse dialing means, operated in response to said pulse dialing means to disconnect said voice and transmission circuit from said line connection.

3. The circuit of claim 1, wherein: said current regulator comprises a transistor connected to a resistor.

4. The circuit of claim 1, wherein: said pulse dialing means comprise a pulse dialer circuit.

5. The circuit of claim 4, wherein: said pulse dialing means further comprise a transistor connected to said pulse dialer circuit.

* * * * *